United States Patent [19]

Malloy-Desormeaux

[11] Patent Number: 4,724,451

[45] Date of Patent: Feb. 9, 1988

[54] CAMERA APPARATUS FOR REDUCING TORQUE LOAD ON MOTORIZED DRIVE DURING FILM INITIALIZATION

[75] Inventor: Stephen G. Malloy-Desormeaux, Rochester, N.Y.

[73] Assignee: Eastman Kodak Company, Rochester, N.Y.

[21] Appl. No.: 26,415

[22] Filed: Mar. 16, 1987

[51] Int. Cl.⁴ .......................... G03B 1/12; G03B 17/42
[52] U.S. Cl. .................... 354/204; 354/173.1
[58] Field of Search ................ 354/173.1, 173.11, 204, 354/205

[56] References Cited

U.S. PATENT DOCUMENTS

| | | | |
|---|---|---|---|
| 3,932,878 | 1/1976 | Kurei | 354/153 |
| 4,086,603 | 4/1978 | Kozuki et al. | 354/204 |
| 4,516,843 | 5/1985 | Ohmura | 354/173.1 |
| 4,671,636 | 6/1987 | Malloy-Desormeaux | 354/173.1 X |

Primary Examiner—Michael L. Gellner
Attorney, Agent, or Firm—Roger A. Fields

[57] ABSTRACT

Normally in a camera, when a release button is manually depressed, a shutter is actuated to expose a section of film. Then, a motorized drive is actuated to re-set the shutter and advance the film for the next exposure. Conversely, when a cartridge of fresh film is loaded in the camera, the release button is manually depressed to actuate the motorized drive to position the film for the first exposure. However, according to the invention, the shutter is prevented from being actuated in order to avoid the need for the motorized drive to have to re-set the shutter. This allows the motorized drive to dedicate its full torque to overcoming the break-away load needed to advance the film from the cartridge for the first time.

5 Claims, 8 Drawing Figures

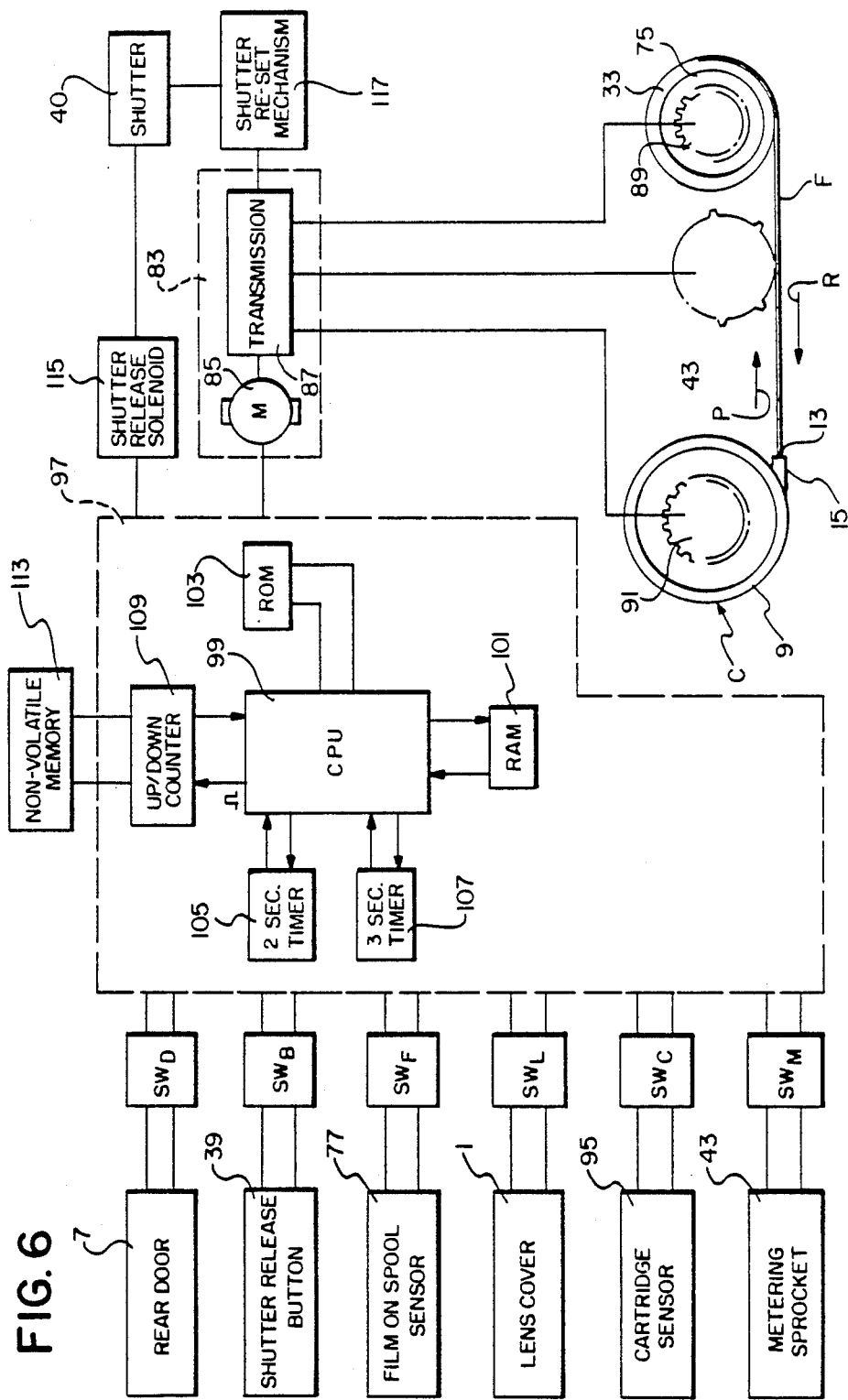

CAMERA APPARATUS FOR REDUCING TORQUE LOAD ON MOTORIZED DRIVE DURING FILM INITIALIZATION

BACKGROUND OF THE INVENTION

1. Field of the Invention

The invention relates generally to the field of photographic cameras and in particular to a camera of the type wherein, when a release button or the like is manually depressed, a shutter is actuated to expose a section of film in the camera and a motorized drive is actuated to advance the film and re-set the shutter for the next exposure.

2. Description of the Prior Art

Typically in a number of motorized cameras adapted to receive a film cartridge containing a filmstrip having successive unexposed frames, such as 35 mm film, manual depression of the release button releases the shutter for opening and closing to expose a film frame positioned in alignment with the shutter. After the shutter is closed, the motorized drive is actuated to advance the filmstrip until a fresh frame is positioned in alignment with the shutter. Simultaneously, the motorized drive re-sets the shutter for the next exposure. Advancing the filmstrip and re-setting the shutter for the next exposure places a combined load on the motorized drive which is relatively high. This combined load is even higher during film initialization when the motorized drive must draw the filmstrip from the cartridge for the first time. When the filmstrip is pulled from the cartridge for the first time, the original film set and the original orientation of the plush fibers in the egress opening of the cartridge impose a break-away load on the motorized drive which is much higher than the pulling load imposed on the motorized drive after the original film set and the original fiber orientation have been altered to conform with film withdrawl from the cartridge. Thus in these prior art cameras the motorized drive may be pushed to its limit during film intialization because the drive must overcome both the film break-away load and the shutter re-setting load. This produces an excessive drain on the batteries used to power the motorized drive, and it can eventually cause the motorized drive to fail.

Recently, several 35 mm cameras have been commercially introduced in which the shutter is not released before the motorized drive is acuated to initialize the filmstrip. As a result, the motorized drive does not have to re-set the shutter during film initialization. This eliminates the shutter re-setting load which would otherwise be imposed on the motorized drive, and thereby allows the motorized drive to dedicate its full torque to overcoming the break-away load required to first pull the filmstrip out of the cartridge for the first time. Generally, in cameras of this type, for example the Ricoh model TF-200 camera, the motorized drive is actuated in response to closure of a rear door of the camera. A problem with those prior art cameras, however, is that once the rear door is closed film initialization must follow, it is automatic. Consequently, after the rear door is closed, the cartridge normally cannot be removed from the camera without exposing the filmstrip. This is undesirable because in certain instances the photographer may wish to replace the film type in the camera with a different type film before taking any pictures.

SUMMARY OF THE INVENTION

The invention provides improved apparatus for reducing the torque load on a motorized drive in a camera during film initialization, by eliminating the need to re-set the shutter when the drive is actuated to initialize the film. However, actuation of the motorized drive is not effected in response to closure of a rear door of the camera as in the above-described prior art example.

According to the invention, there is provided a camera of the type wherein, when a release button or the like is manually depressed, a shutter is actuated to expose a section of film in the camera and a motorized drive is actuated to advance the film and re-set the shutter for the next exposure. In order to initialize fresh film in the camera, a door of the camera must be closed. However, the motorized drive is not then actuated for film initialization as in the above-described prior art, thereby allowing the film to be removed from the camera intact in its cartridge. According to the invention, the motorized drive cannot be actuated until the release button is manually depressed. When the release button is depressed and fresh film in the camera needs to be initialized, the shutter is prevented from being actuated. As a result, the motorized drive will not have to re-set the shutter, and the drive can devote its full torque to overcoming the break-away load required to pull the film out of the cartridge for the first time.

BRIEF DESCRIPTION OF THE DRAWINGS

The invention will be described in connection with the drawings, wherein:

FIG. 6 is a schematic representation of a control circuit in the camera; and

DESCRIPTION OF THE PREFERRED EMBODIMENT

The invention is disclosed as being embodied preferably in a 35 mm camera. Because the features of this type of camera are generally well known, the description which follows is directed in particular to photographic elements forming part of or cooperating directly with the disclosed embodiment. It is understood, however, that other elements not specifically shown or described may take various forms known to persons of ordinary skill in the art.

Figure 1:
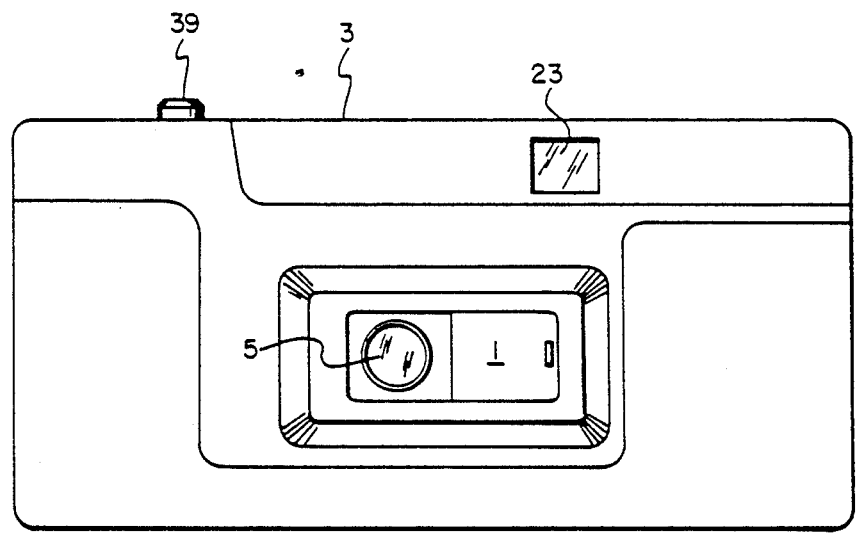
FIG. 1 is a front elevation view of a 35 mm camera capable of initializing fresh film in the camera in accordance with a preferred embodiment of the invention, showing the camera with an integral lens cover opened to uncover the objective lens.
Figure 2:
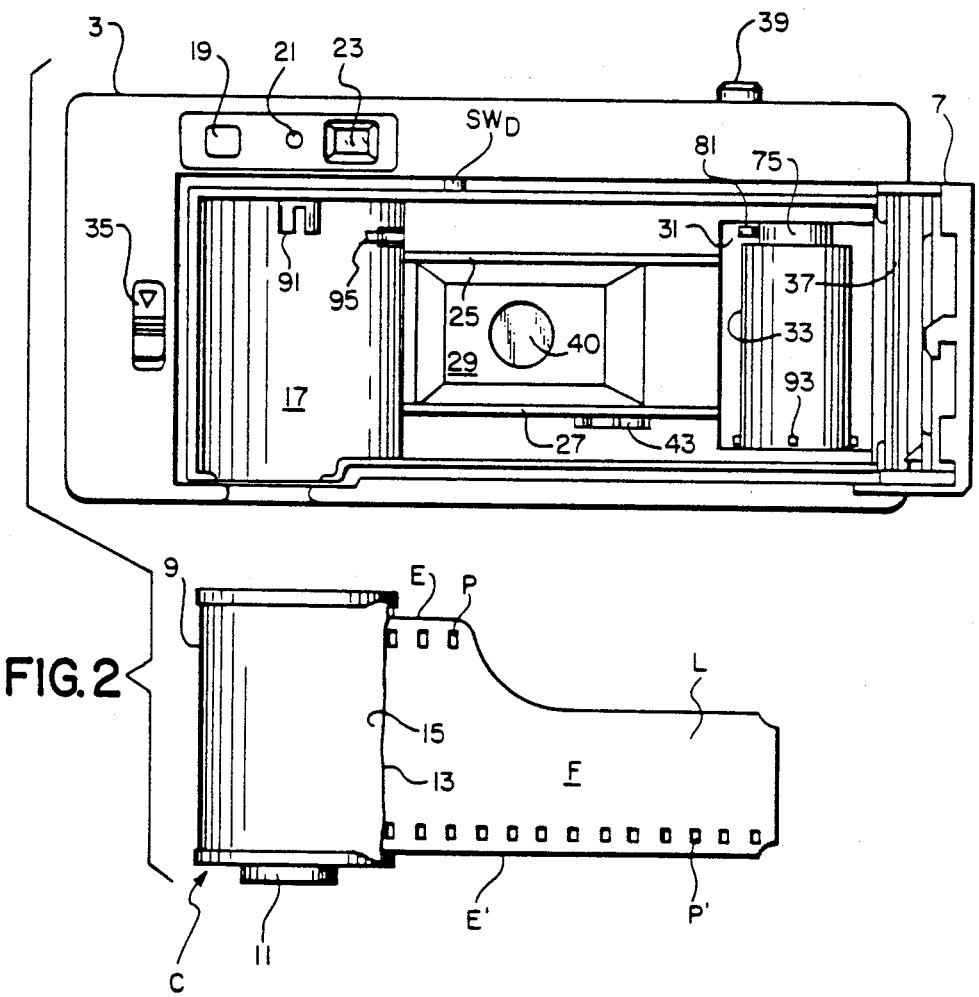
FIG. 2 is a rear elevation view of the camera, showing the camera with its back door opened to receive a conventional 35 mm film cartridge.

Referring now to the drawings and in particular to FIGS. 1 and 2, a 35 mm camera is shown with an integral lens cover 1 slidably mounted on a front face of the camera body 3, opened to uncover an objective lens 5, and with a back door 7 pivotally mounted on a rear portion of the camera body, opened to receive a known film cartridge C, such as one manufactured by Eastman Kodak Company. The film cartridge C comprises a light-tight container 9 housing a rotatably supported spool 11 on which is wound an edge-perforated 35 mm filmstrip F. As viewed in FIG. 2, the filmstrip F has an upper row of perforations P adjacent a longitudinal edge E and a lower row of perforations P' adjacent a longitudinal edge E'. A leader portion L of the filmstrip F projects from a push-lined, light trapping slit 13 in a throat 15 of the cartridge C and has a forward end portion whose width is approximately one-half of the width of the remainder of the filmstrip. The 35 mm camera includes a number of known elements, such as a loading chamber 17 for receiving the cartridge C; a flash ready lamp 19 for a built-in electronic flash, not shown; a low light warning lamp 21; a viewfinder window 23; a pair of substantially parallel film rails 25 and 27; a film exposure window 29 for the objective lens 5; a film take-up chamber 31 housing a film take-up spool 33 or drum; a manually operable latch 35 for securing the back door 7 closed; a pressure plate 37 spring-supported on the inside of the back door for holding successive frames on the filmstrip F flat on the pair of film rails 25 and 27 during film exposure at the exposure window 29; and a shutter release button 39 manually depressible to initiate film exposure by releasing a shutter 40 for opening and closing spring-urged movement from a latched, cocked position to uncover and recover the objective lens 5. In operation, substantially the entire length of the filmstrip F is pre-wound without interruption from the cartridge C onto the take-up spool 33 before any exposures are taken at the exposure window 29. Then, after each exposure at the window 29, the filmstrip F is rewound one frame at a time back into the cartridge C. This is done to protect the exposed frames on the filmstrip F, for example, should the rear door 7 be accidentally or inadvertently opened prematurely, i.e., before the filmstrip is rewound completely into the cartridge.

Figure 3:
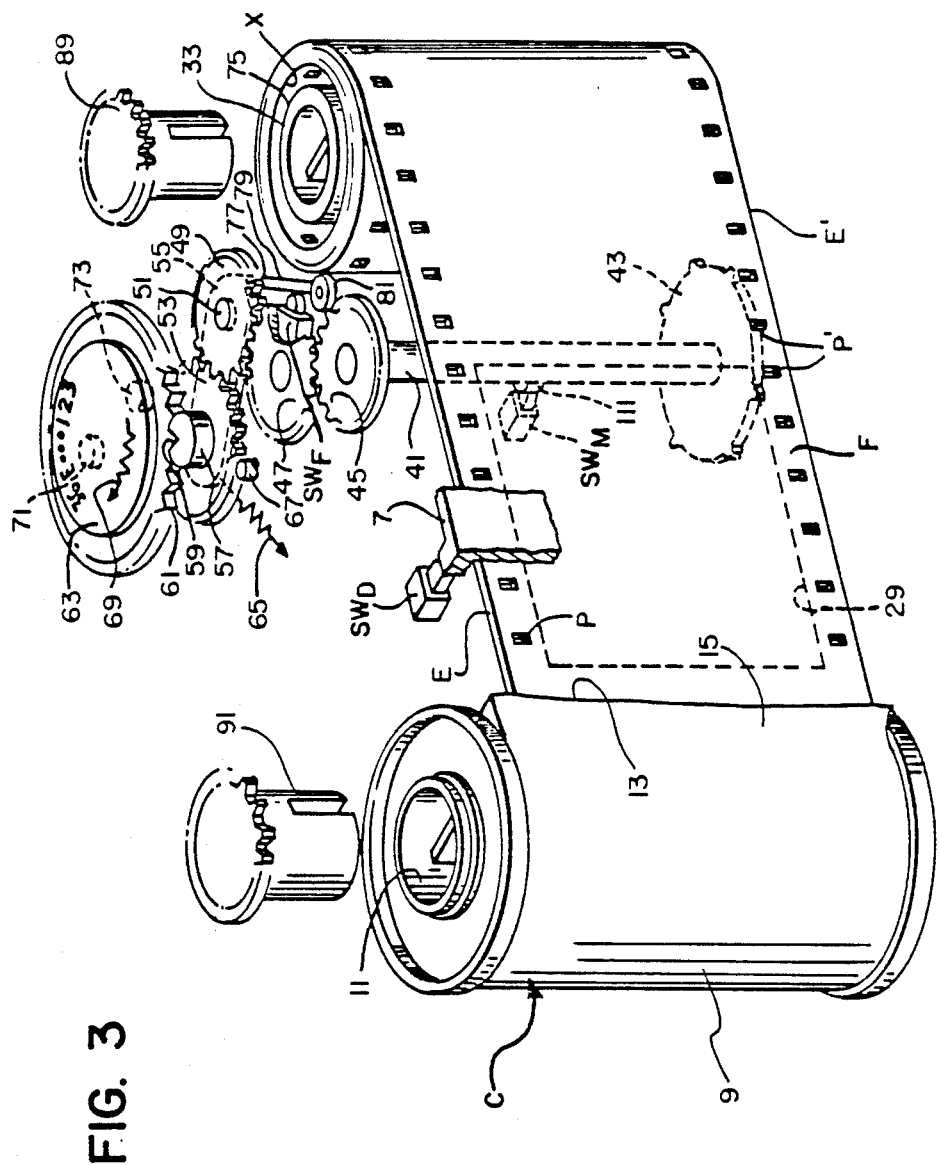
FIG. 3 is a perspective view of film drive apparatus in the camera.
Figure 4:
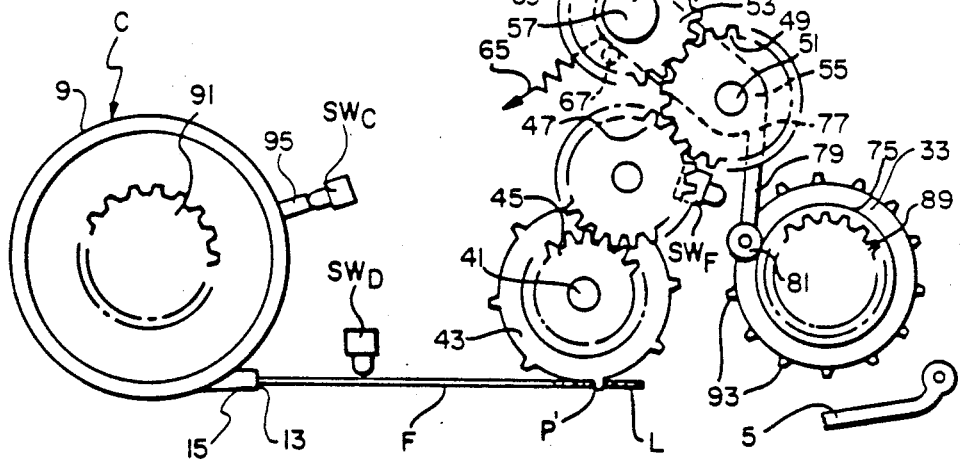
FIG. 4 is a top plan view of the apparatus depicted in FIG. 1, shown with the rear door of the camera opened.

As shown in FIGS. 3 and 4, a coaxial shaft 41 connects a metering sprocket 43 and a metering gear 45 to enable the sprocket and the gear to rotate in unison. The metering sprocket 43 engages the lower row of perforations P' in the filmstrip F as the filmstrip is first pre-wound onto the take-up spool 33 and then is rewound back into the cartridge C. The metering gear 45 continuously engages an intermediate gear 47 which, in turn, continuously engages a pivot gear 49. The pivot gear 49 is supported for rotation about a pivot shaft 51 and continuously engages a counter gear 53. A swing plate 55 on which the pivot gear 49 and the counter gear 53 are disposed is supported on the shaft 51 for pivotal movement about the shaft without disengaging the pivot gear from the counter gear or the intermediate gear 47. A motion-transmitting stud 57 is coaxially fixed on the counter gear 53 and has a single recess 59 for receiving successive peripheral teeth 61 of a rotatable counter disk 63 to rotate the disk in accordance with rotation of the counter gear. The counter disk 63 is located on the outside of the camera and has thirty-six evenly spaced settings represented by the numbers "1, 2, 3, . . . 36" imprinted on the disk. These numbers correspond to successive frames on the filmstrip F. An original empty setting of the counter disk 63 is represented by the letter "E" imprinted on the disk. This is to indicate that the camera is empty.

When the filmstrip F is pre-wound onto the take-up spool 33, the metering sprocket 43 is rotated by pre-winding movement of the filmstrip to increment the counter disk 63 from its original "E" setting to a maximum number setting, such as the "36" setting or a lesser number setting, to indicate the maximum number of unexposed frames on the filmstrip F. Conversely, as the filmstrip F is rewound back into the cartridge C after each exposure, the metering sprocket 43 is rotated by rewinding movement of the filmstrip to decrement the counter disk 63 one setting at a time from its maximum number setting to indicate the remaining number of unexposed frames on the filmstrip. In operation, the metering sprocket 43, the gears 45, 47, 49, and 51, and the motion-transmitting stud 57 are each rotated one revolution between successive frames.

Normally, as shown in FIG. 4, a relatively light separating spring 65 urges the swing plate 55 to pivot in a counter-clockwise direction about the shaft 51 into abutment against a stop pin 67 on the camera body 3. This will cause the motion-transmitting stud 57 to move out of its position against at least one of the peripheral teeth 61 of the counter disk 63 to thereby release the counter disk. Release of the counter disk 63 allows a relatively light initializing spring 69 to rotate the counter disk to reset the disk to its original "E" setting. A stop pin 71 on the underside of the counter disk 63 will contact a stop pin 73 on the camera body 3 to halt the counter disk at its "E" setting. When the motion-transmitting stud 53 is in its position against at least one of the peripheral teeth 61 of the counter disk 63, the initializing spring 69 is not strong enough to rotate the counter disk. A means for moving the motion-transmitting stud 57 to its position against at least one of the peripheral teeth 61 of the counter disk 63 is described below.

Figure 5:
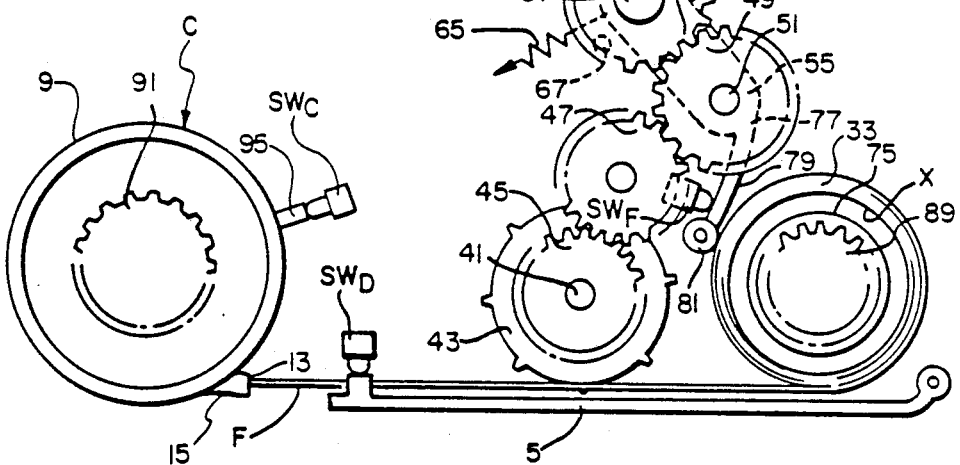
FIG. 5 is a top plan view of the apparatus depicted in FIG. 1, shown with the rear door of the camera closed.

The take-up spool 33 includes a relieved annular portion 75 on its peripheral edge having a smaller diameter than the remainder of the take-up spool. A film-on-spool sensor 77, integrally formed with the swing plate 55, includes a resiliently flexible sensing finger 79 for sensing the presence and the absence or the filmstrip F on the take-up spool 33. As shown in FIG. 4, the separating spring 65 urges the swing plate 55 to position an idler roller 61 on a free end of the sensing finger 79 in abutment against the relieved annular portion 75 of the take-up spool 33. In this instance, the motion-transmitting stud 57 is removed from its position against at least one of the peripheral teeth 61 of the counter disk 63, and the counter disk is reset to its "E" setting by the initializing spring 69. When the leader portion L of the filmstrip F is wound onto the take-up spool 33, a longitudinal (full width) section X of the first convolution of the filmstrip will be spaced opposite the relieved annular portion 75. See FIG. 5. The idler roller 81 will ride on the longitudinal section X, thereby being separated from the relieved annular portion 75. This causes the sensing finger 79 of the film-on-spool sensor 73 to pivot the swing plate 55 in a clockwise direction about the shaft 51 until the motion-transmitting stud 57 is moved to its position against at least one of the peripheral teeth 61 of the counter disk 63. If the rear door 7 is accidentally or inadvertently opened when the filmstrip F is wound at least partly on the take-up spool 33, the counter disk 63 cannot be reset to its original "E" setting by the return spring 69 because the motion-transmitting stud 57 remains in its position against at least one of the peripheral teeth 61 of the counter disk.

In FIG. 6, there is schematically depicted a motorized film drive mechanism 83 comprising a conventional bi-directional motor 85 and a conventional drive transmission 87. As shown, the transmission 87 is coupled to the metering sprocket 43 and to respective drive hubs 89 and 91 which engage the take-up spool 33 and the supply spool 11 of the cartridge C. When the cartridge C is loaded in the camera, as shown in FIG. 4, the leader portion L of the filmstrip F is located over the metering sprocket 43 to position one or more successive perforations P' in the leader portion in engagement with the sprocket. The motorized film drive mechanism 83 initially rotates the metering sprocket 43 in order to advance the leader portion L of the filmstrip F onto the take-up spool 33. The take-up spool 33 has respective teeth 93 for engaging the successive perforations P' in the leader L of the filmstrip F and is rotated by the motorized film drive mechanism 83 at a faster speed than the metering sprocket 43. A film tension responsive clutch, not shown, in the transmission 87 de-couples the metering sprocket 43 from its rotational drive in response to the resulting pull on the filmstrip F caused by engagement of the leader portion L of the filmstrip to the faster rotating take-up spool 33. Thereafter, the metering sprocket 33 operates in an idling capacity, that is, it is rotated by movement of the filmstrip F.

As shown in FIG. 6, there are provided respective switches $SW_D$, $SW_B$, $SW_F$, $SW_L$, $SW_C$, and $SW_M$ operatively associated with the rear door 7, the shutter release button 39, the film-on-spool sensor 77, the lens cover 1, a cartridge sensor 95 and the metering sprocket 43. In turn, the switches $SW_D$, $SW_B$, $SW_F$, $SW_L$, $SW_C$, and $SW_M$ are connected individually to a conventional digital microcomputer 97 such as used in many recent cameras. The microcomputer 97 includes a central processing unit (CPU) 99, a random access memory (RAM) 101, a read only memory (ROM) 103, a two second timer 105, a three second timer 107, and an up/down counter 109. As is described below, the microcomputer 97 is used to control operation of the shutter 40 to take an exposure and to control operation of the motorized film drive mechanism 83 to prewind the filmstrip F onto the take-up spool 1 and to rewind the filmstrip back into the cartridge C. The switch $S_D$ is closed when the rear door 7 is closed and is opened when the rear door is opened. The switch $SW_B$ is closed each time the shutter release button 37 is depressed and is opened when the button is released. The switch $SW_F$ is closed by the sensing finger 79 of the film-on-spool sensor 77 when the sensing finger is moved away from the take-up spool 33 in response to pre-winding of the leader portion L of the filmstrip F onto the spool and is opened when the sensing finger returns to the spool once the filmstrip is completely wound off the spool. The switch $SW_L$ is closed when the lens cover 1 is closed and is opened when the lens cover is opened. The switch $SW_C$ is closed when the cartridge sensor 95 determines that the cartridge C is in the loading chamber 17 and is opened when the cartridge sensor determines that the loading chamber is empty. The switch $SW_M$ is closed by cam 111 on the coaxial shaft 41, as shown in FIG. 3, each time the metering sprocket 43 is rotated a single revolution. When the metering switch $SW_M$ is closed, a metering pulse is generated in the microcomputer 97. The metering pulse is counted up in the up/down counter 109 during pre-winding movement of the filmstrip F, to increment the counter by "1", and is counted down during rewinding movement of the filmstrip, to similarly decrement the counter. A non-volatile memory 113 or other means, such as a back-up battery, is provided to maintain the pulse count in the up/down counter 109 when an on/off switch, not shown, on the camera body 3 is turned off but some film is present on the take-up spool 33.

OPERATION

Figure 7A:
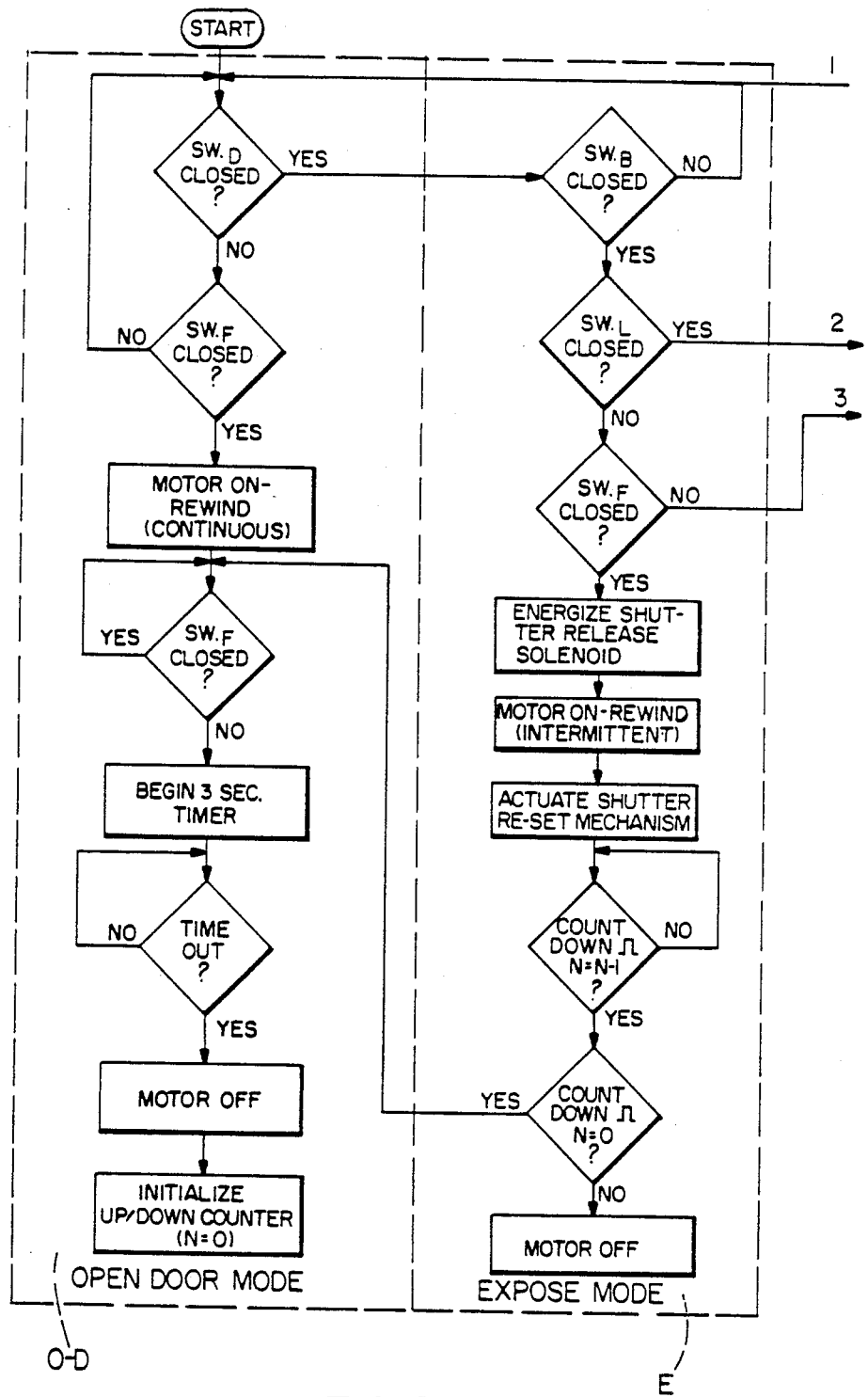
FIG. 7a and 7b together form a flow chart illustrating operation of the control circuit.
Figure 7B:
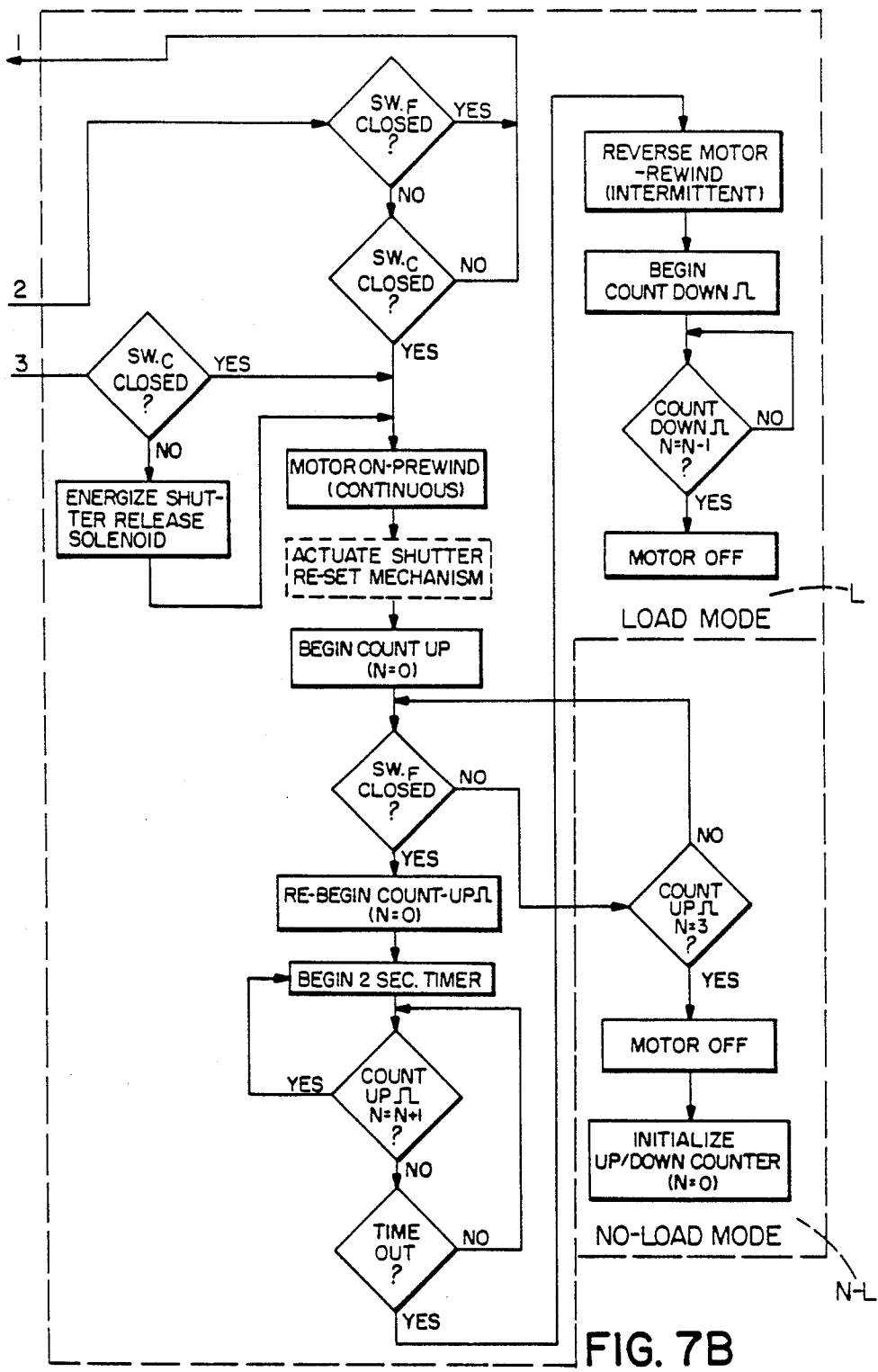

FIGS. 7a and 7b together form a flow chart which illustrates four explicit routines of the microcomputer 97 which are effected in cooperation with the switches $SW_D$, $SW_B$, $SW_F$, $SW_L$, $SW_C$, and $SW_M$ to control operation of the shutter 40 and the motorized film drive mechanism 83.

(1) Load Mode

This mode corresponds to the routine L of the microcomputer 97. If in FIG. 7A the switch $SW_D$ is closed because the rear door 7 is closed, the switch $SW_B$ is closed because the shutter release button 39 is depressed, the switch $SW_L$ is open because the lens cover 1 is open, and the switch $SW_F$ is open because no film is present on the take-up spool 33, and in FIG. 7B the switch $SW_C$ is closed because the cartridge C is in the loading chamber 17, then a shutter release solenoid 115 connected to the microcomputer 97 and to the shutter 40 will not be energized to release the shutter from its cocked position for opening and closing. If in FIG. 7A the switches $SW_D$ and $SW_B$ are closed as in the previous instance, but the switch $SW_L$ is closed because the lens cover 1 is closed, and FIG. 7B the switches $SW_F$ and $SW_C$ are closed as in the previous instance, then similarly the shutter release solenoid 115 will not be energized to release the shutter 40 for opening and closing. Following either of these sequences, in FIG. 7B the motor 85 will be energized to drive the transmission 87 in a pre-wind direction for film movement as depicted by the arrow P in FIG. 6. The transmission 87 will rotate the metering sprocket 43 and the drive hub 89 for the take-up spool 33. At this time, the drive hub 91 for the supply spool 11 of the cartridge C is disconnected from the transmission 87, allowing the supply spool to idle. After the motor 85 is energized in FIG. 7B, the up/down counter 109 will begin to count up from "0" by "1" each time a metering pulse is produced in response to closing of the switch $SW_M$ when the metering sprocket 43 completes a single revolution. If the switch $SW_F$ is closed because the leader portion L of the filmstrip F has been wound onto the take-up spool 33, the two sec. timer 105 will begin and the up/down counter 109 will re-begin its count-up from "0". The substantial length of the filmstrip F, following the leader portion L, will then be pre-wound onto the take-up spool 33. If the up/down counter 109 is incremented by "1" before the two sec. timer 105 times out, the timer will begin again. When the substantial length of the filmstrip F has been pre-wound onto the take-up spool 33, the take-up spool is prevented from withdrawing the remainder of the filmstrip from the cartridge C because a trailing end of the filmstrip is secured to the supply spool 11 within the cartridge. This end of film condition causes film movement to stall. As a result, the up/down counter 109 will not be incremented by "1" before the two sec. timer 105 times out. This causes the motor 85 first to be de-energized and then to be re-energized in an opposite direction to drive the transmission 87 in a re-wind direction for film movement as depicted by the arrow R in FIG. 6. The reversed transmission 87 pivots an operatively connected gear or the like, not shown, into driving relation with the drive hub 91 for the supply spool 11 of the cartridge C, causing the hub and the spool to be rotated by the transmission to wind up the filmstrip F as it is returned to the cartridge. Simultaneously, the up/down counter 109 begins a countdown of the metering pulses from its total count obtained during pre-winding. When the up/down counter 109 is decremented by "1", the first frame of the filmstrip F will be in the focal plane of the objective lens 5. Then, the motor 85 is de-energized, thereby concluding the load mode L.

Thus in the load mode L the first frame of the filmstrip F can be advanced to the focal plane of the objective lens 5, whether the lens cover 1 is opened or closed, and without energizing the shutter release solenoid 115 to release the shutter 40, when the cartridge C is in the loading chamber 17 and the take-up spool 33 is initially empty.

(2) No-Load or Dry Cycle Mode

This mode corresponds to the routine N-L of the microcomputer 97. If in the load mode L in FIG. 7A the switch $SW_F$ is open because no film is present on the take-up spool 33 and in FIG. 7B the switch $SW_C$ is open because no cartridge C is in the loading chamber 17, then according to the no-load mode N-L the shutter release solenoid 115 will be energized to release the shutter 40 for opening and closing. Following this in FIG. 7B, the motor 85 will be energized to drive the transmission 87 in the prewind direction, but only to actuate a conventional shutter re-set mechanism 117 connected via the transmission to the metering sprocket 43. Although not shown, the shutter re-set mechanism 117 may comprise a setting cam which is rotated 360° in accordance with rotation of the metering sprocket 43 to re-set the shutter 40 to its cocked position. When the shutter 40 is not released as in the load mode L because the shutter release solenoid 115 is not energized, the shutter re-set mechanism 117 does not have to re-set the shutter. This is the reason that the step "ACTUATE SHUTTER RE-SET MECH." in FIG. 7B is enclosed by a broken line. If in the load mode L in FIG. 7B the switch $SF_F$ remains open because the take-up spool 33 remains empty after the motor 85 is energized to drive the transmission 87 in the pre-wind direction, and in the no-load mode N-L in FIG. 7B the up/down counter 109 counts up to "3", but the switch $SW_F$ has not yet closed because the take-up spool is still empty, the motor will be de-energized and the counter will be reset to "0", thereby concluding the no-load mode.

Thus the no-load mode N-L has application both when a film take-up malfunction has occurred because the leader portion L of the filmstrip F has failed to be secured to the take-up spool 33 and when operation of the camera is demonstrated in a dry run. i.e., without the cartridge C in the loading chamber 17.

(3) Expose Mode

This mode corresponds to the routine E of the microcomputer 97. If in FIG. 7A the switch $SW_D$ is closed because the rear door 7 is closed, the switch $SW_B$ is closed because the shutter release button 39 is depressed, the switch $SW_L$ is open because the lens cover 1 is open, and the switch $SW_F$ is closed because film is present on the take-up spool 33, then the shutter release solenoid 115 will be energized to release the shutter 40 for opening and closing. Following this, the motor 85 will be energized to drive the transmission 87 in the rewind direction. As a result, the supply spool 11 of the cartridge C will be rotated by the drive hub 91 to rewind an exposed frame into the cartridge, and the take-up spool 33 will be rotated by the drive hub 89 to advance a fresh frame off the take-up spool and into the focal plane of the objective lens 5. Also, the shutter re-set mechanism 117 will be actuated to re-set the shutter 40. When the up/down counter 109 is decremented by "1", but the counter has not dropped to "0", the motor 83 will be de-energized, thereby concluding the exposure mode E. Otherwise, if the up/down counter 109 has dropped to "0", then, when the switch $SW_F$ is closed because the filmstrip F has been completely wound off the take-up spool, the three sec. timer 107 will begin. When the three sec. timer 107 times out, the leader portion L of the filmstrip F will have been rewound into the cartridge C. Then, the motor 85 will be de-energized and, merely as a precaution, the up/down counter 109 will be re-initialized, thereby concluding the exposure mode.

If in the expose mode E the switch $SW_L$ is closed because the lens cover 1 is closed and the switch $SW_F$ is closed because film is present on the take-up spool 33, then the expose mode will be prematurely cancelled to prevent energization of the shutter solenoid 115 and the motor 85.

(4) Open Door Mode

This mode corresponds to the routine O-D of the microcomputer 97. If in FIG. 7A the switch $SW_D$ is open because the rear door 7 is open, but the switch $SW_F$ is closed because film is present on the take-up spool 1, the motor 83 will be energized to drive the transmission 87 in the rewind direction. Then, only when the switch $SW_F$ is opened because the filmstrip F has been completely wound off the take-up spool 33, the three sec. timer 107 will begin. When the three sec. timer 107 times out, the leader portion L of the filmstrip F will have been rewound into the cartridge C. Then, the motor 83 will be de-energized and, merely as a precaution, the counter 75 will be re-initialized, thereby concluding the open door mode.

The invention has been described with reference to a preferred embodiment. However, it will be appreciated that variations and modifications can be effected within the ordinary skill in the art without departing from the scope of the invention. For example, a combination of logic gates or switching circuits which make digital decisions may be used in controlling operation of the motorized film drive mechanism 83. Alternatively, a mechanical analog system may be used. In another example, a tension sensing member responsive to the sudden increase in film tension arising at the end of pre-winding, when the take-up spool 33 attempts to withdraw the remainder of the filmstrip F from the cartridge C, may be used to reverse the motor 85. In a third example, the up/down counter 109 may be connected to a decoder which, in turn, is connected to a liquid crystal display or a light emitting diode array to provide an indication of the frame count. In a fourth example, in place of the film-on-spool sensor 77, a means for sensing rotation of the metering sprocket 43 during movement of the filmstrip F in the prewind direction may be used to determine that film is present on the take-up spool. In a fifth example, in place of the cartridge sensor 95, a means for reading a film speed or other code on the cartridge C may be used to determine that the cartridge is in the loading chamber 17. In a sixth example, a shutter sensor switch may be connected to the microcomputer 97 to actuate the shutter re-set mechanism 117 after the shutter 40 is closed and to prevent actuation of the re-set mechanism when the shutter is not released.

I claim:

1. An improved photographic camera for use with a filmstrip having successive unexposed frames, wherein (a) shutter means is actuated in response to manual depression of a shutter release for opening and closing to expose a film frame positioned in alignment with said shutter means and (b) motorized means is actuated after said shutter means is closed to re-set the shutter means for the next exposure and to advance the filmstrip until a fresh frame is positioned in alignment with the shutter means, and wherein the improvement comprises:

sensing means for sensing that a filmstrip must be initialized to position its first frame in alignment with said shutter means; and control means operating in response to manual depression of said shutter release, when said sensing means senses that the filmstrip must be initialized, for actuating said motorized means to initialize the filmstrip, but preventing said shutter means from being actuated in response to manual depression of the shutter release to thereby avoid the need for the motorized means to have to re-set the shutter means during initialization of the filmstrip.

2. An improved photographic camera wherein (a) a loading chamber is adapted to receive a film cartridge containing a filmstrip having successive unexposed frames, (b) shutter means is actuated in response to manual depression of a shutter release for opening and closing to expose a film frame positioned in alignment with said shutter means, and (c) motorized means is actuated after said shutter means is closed to re-set the shutter means for the next exposure and to advance the filmstrip until a fresh frame is positioned in alignment with the shutter means, and wherein the improvement comprises:

cartridge sensing means for sensing that a film cartridge is in said loading chamber;

film sensing means for sensing that a filmstrip must be initialized to position its first frame in alignment with said shutter means; and control means operating in response to manual depression of said shutter release, when said cartridge sensing means senses that a film cartridge is in said loading chamber and said film sensing means senses that the filmstrip must be initialized, for actuating said motorized means to initialize the filmstrip, but preventing said shutter means from being actuated in response to manual depression of the shutter release to thereby avoid the need for the motorized means to have to re-set the shutter means during initialization of the filmstrip.

3. An improved photographic camera wherein (a) a loading chamber is adapted to receive a film cartridge containing a filmstrip having successive unexposed frames, (b) a film take-up spool takes up the filmstrip from the cartridge, (c) shutter means is actuated in response to manual depression of a shutter release for opening and closing to expose a film frame positioned in alignment with said shutter means, and (d) motorized means is actuated after said shutter means is closed to re-set the shutter means for the next exposure and to advance the filmstrip until a fresh frame is positioned in alignment with the shutter means, and wherein the improvement comprises:

cartridge sensing means for sensing that a film cartridge is in said loading chamber;

film sensing means for sensing that said take-up spool is empty; and control means operating in response to manual depression of said shutter release, when said cartridge sensing means senses that a film cartridge is in said loading chamber and said film sensing means senses that said take-up spool is empty, for actuating said motorized means to initialize the filmstrip by advancing the filmstrip onto the take-up spool and positioning its first frame in alignment with said shutter means, but preventing said shutter means from being actuated in response to manual depression of the shutter release to thereby avoid the need for the motorized means to have to re-set the shutter means during initialization of the filmstrip.

4. An improved photographic camera wherein (a) a loading chamber is adapted to receive a film cartridge containing a filmstrip having successive unexposed frames, (b) a film take-up spool takes up the filmstrip from the cartridge, (c) shutter means is actuated in response to manual depression of a shutter release for opening and closing to expose a film frame positioned in alignment with said shutter means, and (d) motorized means is actuated after said shutter means is closed to re-set the shutter means for the next exposure and to advance the filmstrip until a fresh frame is positioned in alignment with the shutter means, and wherein the improvement comprises:

cartridge sensing means for sensing that a film cartridge is in said loading chamber;

film sensing means for sensing whether the filmstrip is on said take-up spool or the spool is empty; and control means operating in response to manual depression of said shutter release, when said cartridge sensing means senses that a film cartridge is in said loading chamber and said film sensing means senses that said take-up spool is empty, for actuating said motorized means to initialize the filmstrip by advancing the filmstrip onto the take-up spool and positioning its first frame in alignment with said shutter means, but preventing said shutter means from being actuated in response to manual depression of the shutter release to thereby avoid the need for the motorized means to have to re-set the shutter means during initialization of the filmstrip, and operating in response to manual depression of said shutter release, when said cartridge sensing means senses that a film cartridge is in said loading chamber and said film sensing means senses that the filmstrip is on said take-up spool, for first releasing said shutter means to expose a film frame positioned in alignment with the shutter means and then after the shutter means is closed actuating said motorized means to re-set the shutter means and to advance the filmstrip until a fresh frame is positioned in alignment with the shutter means.

5. An improved photographic camera for use with a filmstrip having successive unexposed frames, wherein (a) in a dry cycle or demonstration mode shutter means is actuated without a filmstrip in said camera in response to manual depression of a shutter release and (b) in a film initialization mode a filmstrip in said camera is advanced to position a first frame in alignment with said shutter means in response to manual depression of said shutter release, and wherein the improvement comprises:

control means for distinguishing between the dry cycle mode and the film initialization mode for actuating said shutter means in response to manual depression of said shutter release, when said camera is in the dry cycle mode, but preventing actuation of said shutter means in response to manual depression of said shutter release, when said camera is in the film initialization mode.

* * * * *